US012162467B2

(12) United States Patent
Suzuki

(10) Patent No.: US 12,162,467 B2
(45) Date of Patent: Dec. 10, 2024

(54) CONTROL APPARATUS

(71) Applicant: SUBARU CORPORATION, Tokyo (JP)

(72) Inventor: Hiroyuki Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 280 days.

(21) Appl. No.: 17/529,835

(22) Filed: Nov. 18, 2021

(65) Prior Publication Data

US 2022/0169233 A1 Jun. 2, 2022

(30) Foreign Application Priority Data

Dec. 1, 2020 (JP) .................................. 2020-199371

(51) Int. Cl.
*G05D 1/00* (2024.01)
*B60W 10/06* (2006.01)
(Continued)

(52) U.S. Cl.
CPC ............ *B60W 20/11* (2016.01); *B60W 10/06* (2013.01); *B60W 10/08* (2013.01); *B60W 10/113* (2013.01); *B60W 10/115* (2013.01); *B60W 20/13* (2016.01); *B60W 20/15* (2016.01); *B60W 2510/0623* (2013.01);
(Continued)

(58) Field of Classification Search
CPC ..................................................... B60W 20/11
See application file for complete search history.

(56) References Cited

U.S. PATENT DOCUMENTS 6,314,347 B1 11/2001 Kuroda et al.
2009/0030568 A1 1/2009 Amano et al.
(Continued)

FOREIGN PATENT DOCUMENTS

JP 2000-333305 A 11/2000
JP 2007-213324 A 8/2007
(Continued)

OTHER PUBLICATIONS

Office Action issued on Aug. 27, 2024 in corresponding Japanese Application No. 2020-199371, 6 pages.

Primary Examiner — Tuan C To
Assistant Examiner — Paul W Arellano
(74) Attorney, Agent, or Firm — Rimon P.C.

(57) ABSTRACT

A control apparatus is configured to control a vehicle. The vehicle includes an engine, a generator, and a drive motor. The generator is configured to generate electric power by using motive power to be outputted from the engine. The drive motor is coupled to a drive wheel. The engine, the generator, and the drive motor are coupled to each other via a planetary gear mechanism. The control apparatus includes a processor configured to control an operating point of the engine by controlling respective operations of the generator and the drive motor. The processor is configured to change a fuel consumption characteristic of the engine on the basis of traveling characteristic data, and to control the operating point of the engine on the basis of the fuel consumption characteristic. The traveling characteristic data indicates a traveling characteristic in the past of the vehicle driven by a driver of the vehicle.

18 Claims, 13 Drawing Sheets

(51) Int. Cl.
- *B60W 10/08* (2006.01)
- *B60W 10/113* (2012.01)
- *B60W 10/115* (2012.01)
- *B60W 20/11* (2016.01)
- *B60W 20/13* (2016.01)
- *B60W 20/15* (2016.01)

(52) U.S. Cl.
CPC ... *B60W 2510/244* (2013.01); *B60W 2540/30* (2013.01); *B60W 2556/10* (2020.02); *B60W 2710/0627* (2013.01)

(56) References Cited

U.S. PATENT DOCUMENTS

| | | | |
|---|---|---|---|
| 2014/0279397 A1* | 9/2014 | Schmidt | G06Q 40/03 705/38 |
| 2015/0203096 A1 | 7/2015 | Wang et al. | |
| 2015/0246676 A1* | 9/2015 | Keren | B60W 30/146 701/93 |
| 2015/0298570 A1* | 10/2015 | Hisano | B60W 50/082 701/22 |
| 2018/0229715 A1* | 8/2018 | Kinoshita | B60K 6/485 |

FOREIGN PATENT DOCUMENTS

| | | |
|---|---|---|
| JP | 2007-223357 A | 9/2007 |
| JP | 2013-169915 A | 9/2013 |
| JP | 2019-116153 A | 7/2019 |

* cited by examiner

CONTROL APPARATUS

CROSS-REFERENCE TO RELATED APPLICATIONS

The present application claims priority from Japanese Patent Application No. 2020-199371 filed on Dec. 1, 2020, the entire contents of which are hereby incorporated by reference.

BACKGROUND

The technology relates to a control apparatus.

A hybrid vehicle including an engine and a drive motor as drive sources has been widely used in recent years. In such a vehicle, the engine, a generator generating electric power by using motive power outputted from the engine, and the drive motor coupled to a drive wheel may be coupled to each other via a planetary gear mechanism serving as a power split mechanism. For example, reference is made to Japanese Unexamined Patent Application Publication No. 2019-116153. The planetary gear mechanism may divide the motive power outputted from the engine, and transmit the divided motive power to the generator and the drive motor.

SUMMARY

An aspect of the technology provides a control apparatus configured to control a vehicle. The vehicle includes an engine, a generator, and a drive motor. The generator is configured to generate electric power by using motive power to be outputted from the engine. The drive motor is coupled to a drive wheel. The engine, the generator, and the drive motor are coupled to each other via a planetary gear mechanism. The control apparatus includes a processor. The processor is configured to control an operating point of the engine by controlling respective operations of the generator and the drive motor. The processor is configured to change a fuel consumption characteristic of the engine on the basis of traveling characteristic data, and to control the operating point of the engine on the basis of the fuel consumption characteristic. The traveling characteristic data indicates a traveling characteristic in the past of the vehicle driven by a driver of the vehicle.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
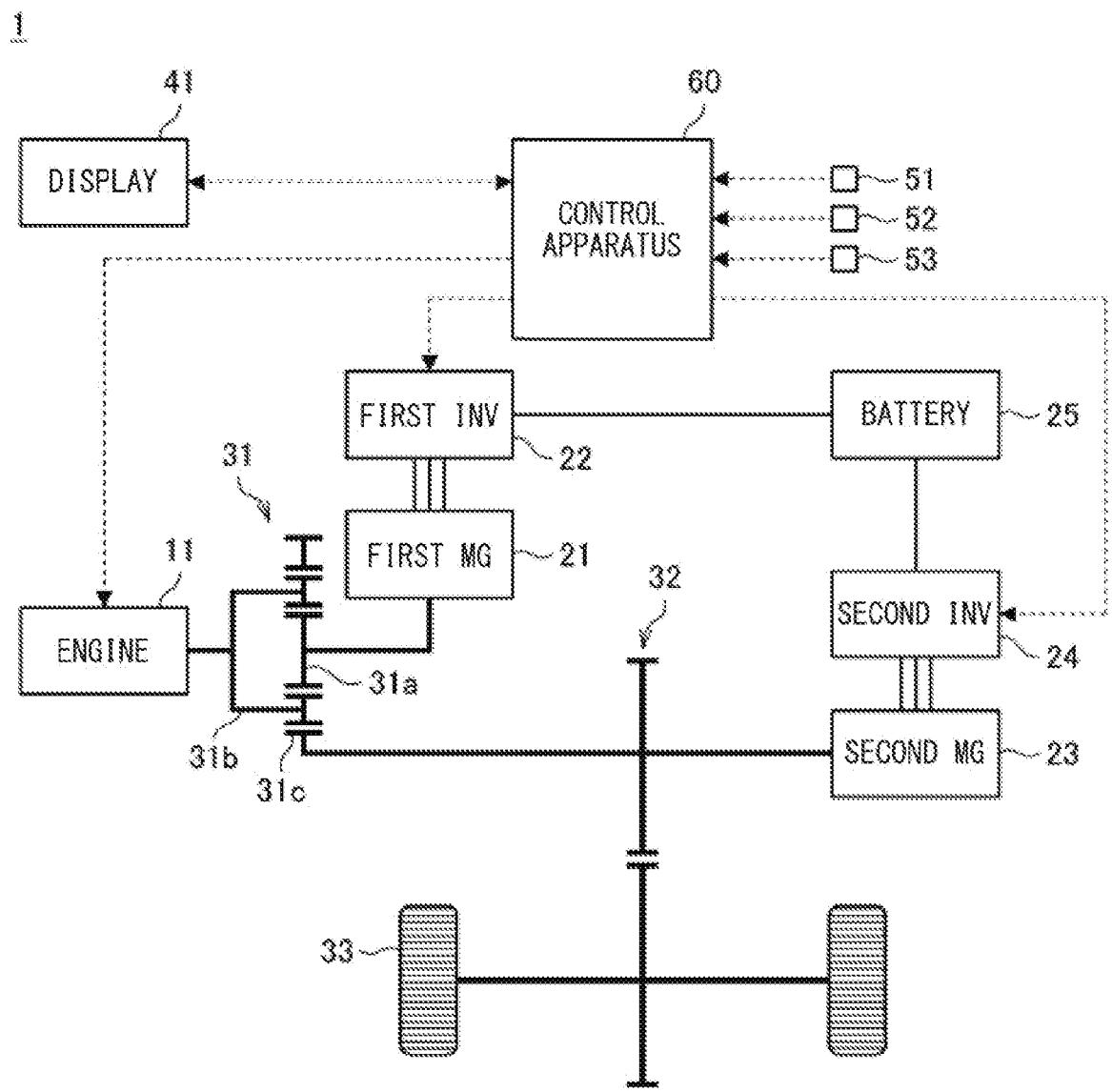
FIG. 1 is a diagram schematically illustrating an example of an outline configuration of a vehicle in one example embodiment of the technology.

In a hybrid vehicle, controlling respective operations of a generator and a drive motor makes it possible to control a rotational speed and torque of an engine, that is, to control an operating point of the engine. As a result, it is possible to improve energy efficiency, including fuel consumption, of the vehicle. However, a driving style can differ from one driver to another. It can thus be difficult for some drivers to benefit from appropriately improved energy efficiency of the vehicle.

It is desirable to provide a control apparatus that makes it possible to improve energy efficiency of a vehicle.

Some example embodiments of the technology will now be described in detail with reference to the accompanying drawings. Note that sizes, materials, specific values, and any other factors illustrated in respective example embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the present specification and the drawings, elements having substantially the same function and configuration are denoted with the same reference numerals without any redundant description. Further, elements that are not directly related to the technology are not illustrated in the drawings. The drawings are schematic and are not intended to be drawn to scale.

[Example Configuration of Vehicle]

A configuration of a vehicle 1 in an example embodiment of the technology will now be described with reference to FIGS. 1 to 3.

FIG. 1 schematically illustrates an outline configuration of the vehicle 1. Referring to FIG. 1, the vehicle 1 may include an engine 11, a first motor generator 21, a first inverter 22, a second motor generator 23, a second inverter 24, a battery 25, a planetary gear mechanism 31, a group of gears 32, a drive wheel 33, a display 41, a vehicle speed sensor 51, an engine rotational speed sensor 52, a gradient sensor 53, and a control apparatus 60. The planetary gear mechanism 31 may include a sun gear 31a, a carrier 31b, and a ring gear 31c. The first motor generator 21, the first inverter 22, the second motor generator 23, and the second inverter 24 correspond to a first MG, a first INV, a second MG, and a second INV in FIG. 1, respectively.

In one embodiment, the first motor generator 21 may serve as a "generator". In one embodiment, the second motor generator 23 may serve as a "drive motor".

The engine 11 may generate motive power by using a fuel such as gasoline. The engine 11 outputs the motive power to drive the drive wheel 33. Note that the motive power outputted from the engine 11 is also used by the first motor generator 21 to generate electric power. The engine 11 may have a crankshaft, or an output shaft, coupled to the carrier 31b of the planetary gear mechanism 31.

The first motor generator 21 may be, for example, a three-phase alternating current motor, and may be coupled to the battery 25 via the first inverter 22. The first motor generator 21 generates electric power by using the motive power outputted from the engine 11. The electric power generated by the first motor generator 21 may be supplied to the battery 25 via the first inverter 22. The battery 25 may be charged thereby. Note that the first motor generator 21 may also be driven with the electric power of the battery 25 and output motive power. The first motor generator 21 may have an output shaft coupled to the sun gear 31a of the planetary gear mechanism 31.

The second motor generator 23 may be, for example, a three-phase alternating current motor, and may be coupled to the battery 25 via the second inverter 24. The second motor generator 23 may be driven with the electric power of the battery 25 and output motive power used to drive the drive wheel 33. Note that the second motor generator 23 may perform electric power regeneration by using kinetic energy of the drive wheel 33 while the vehicle 1 is decelerating. The electric power generated by the second motor generator 23 may be supplied to the battery 25 via the second inverter 24. The battery 25 may be charged thereby. The second motor generator 23 may have an output shaft coupled to the ring gear 31c of the planetary gear mechanism 31.

The engine 11, the first motor generator 21, and the second motor generator 23 are coupled to each other via the planetary gear mechanism 31, as described above. The planetary gear mechanism 31 may be a power split mechanism that divides the motive power outputted from the engine 11 and transmits the divided motive power to the first motor generator 21 and the second motor generator 23. In the planetary gear mechanism 31, the ring gear 31c may be disposed coaxially on an outer circumferential side with respect to the sun gear 31a. The carrier 31b may support a plurality of pinion gears in a manner to allow rotation and revolution thereof. The pinion gears may each be in mesh with the sun gear 31a and the ring gear 31c.

Figure 2:
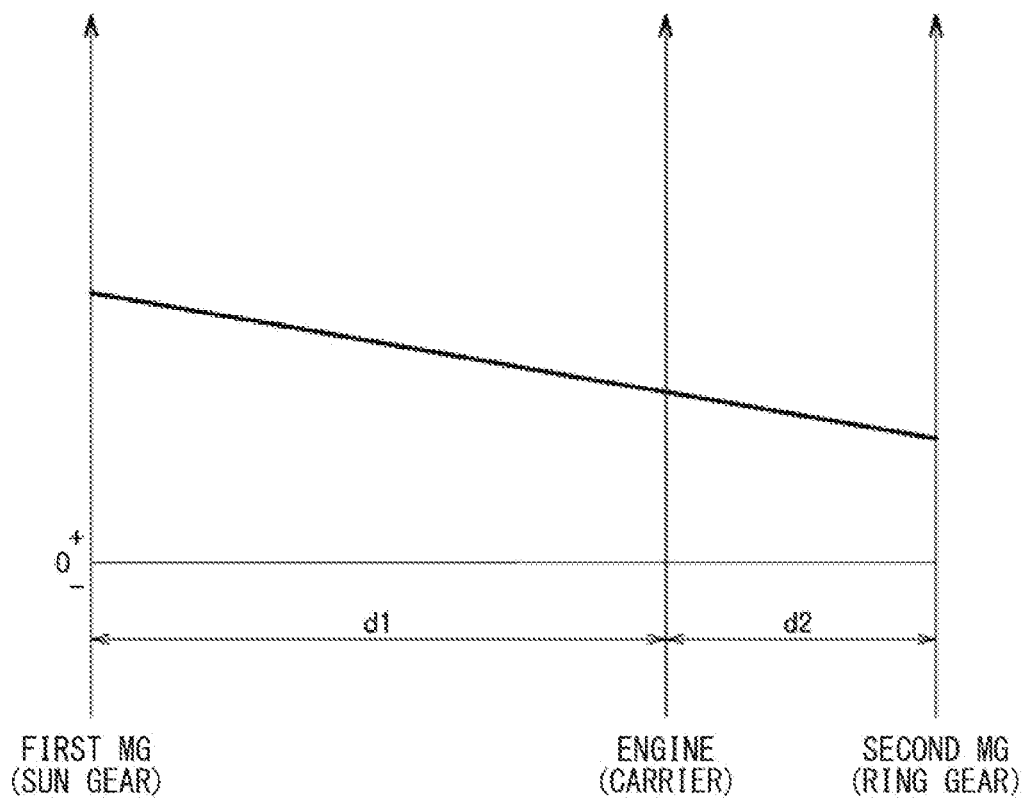
FIG. 2 is a collinear chart illustrating a relationship between respective rotational speeds of an engine, a first motor generator, and a second motor generator in one example embodiment of the technology.

FIG. 2 is a collinear chart illustrating a relationship between respective rotational speeds of the engine 11, the first motor generator 21, and the second motor generator 23. Referring to FIG. 2, a vertical axis representing the rotational speed of the first motor generator 21 (i.e., the rotational speed of the sun gear 31a), a vertical axis representing the rotational speed of the engine 11 (i.e., the rotational speed of the carrier 31b), and a vertical axis representing the rotational speed of the second motor generator 23 (i.e., the rotational speed of the ring gear 31c) are arranged in this order in a collinear chart. In this case, the rotational speed of the engine 11, the rotational speed of the first motor generator 21, and the rotational speed of the second motor generator 23 are in a collinearly aligned relationship with each other. The vertical axis representing the rotational speed of the first motor generator 21 and the vertical axis representing the rotational speed of the engine 11 are at a distance d1 from each other. The vertical axis representing the rotational speed of the engine 11 and the vertical axis representing the rotational speed of the second motor generator 23 are at a distance d2 from each other. A ratio between the distance d1 and the distance d2 is equal to a ratio between the number of teeth of the ring gear 31c and the number of teeth of the sun gear 31a.

As illustrated in FIG. 1, the second motor generator 23 is coupled to the drive wheel 33. For example, the output shaft of the second motor generator 23 may be coupled to the drive wheel 33 via the group of gears 32. The group of gears 32 may include a plurality of gears. The motive power outputted from each of the engine 11 and the second motor generator 23 may be transmitted to the drive wheel 33 via the group of gears 32. Note that the drive wheel 33 may be a front wheel or a rear wheel. Alternatively, the drive wheel 33 may be both of the front wheel and the rear wheel. In such a case, the motive power outputted from an output side of the group of gears 32 is transmitted to both of the front wheel and the rear wheel.

As described above, the vehicle 1 may be a hybrid vehicle with the engine 11 and the second motor generator 23 as drive sources. The vehicle 1 may be switchable between a hybrid-electric-vehicle (HEV) mode, an electric-vehicle (EV) mode, and an engine traveling mode. In the HEV mode, the vehicle 1 travels using motive power outputted from both of the engine 11 and the second motor generator 23. In the EV mode, the vehicle 1 travels using only the motive power outputted from the second motor generator 23, with the engine 11 stopped. In the engine traveling mode, the vehicle 1 travels using only the motive power outputted from the engine 11.

The display 41 may display visual information. Examples of the display 41 include a multi-function display (MFD). The MFD may display various pieces of information, including fuel consumption and travelable distance of the vehicle 1.

The vehicle speed sensor 51 may detect a vehicle speed, which is the speed of the vehicle 1, and output the detected vehicle speed to the control apparatus 60.

The engine rotational speed sensor 52 may detect the rotational speed of the engine 11, and output the detected rotational speed to the control apparatus 60.

The gradient sensor 53 may detect a gradient of a road on which the vehicle 1 is traveling, and output the detected gradient to the control apparatus 60. Examples of the gradient sensor 53 include an acceleration sensor.

The control apparatus 60 may have devices including a central processing unit (CPU) as an arithmetic processing unit, a read only memory (ROM), and a random-access memory (RAM). The ROM may be a memory element that stores a program, a calculation parameter, etc., that are to be used by the CPU. The RAM may be a memory element that temporarily holds, for example, a parameter that changes as appropriate for execution by the CPU.

Figure 3:
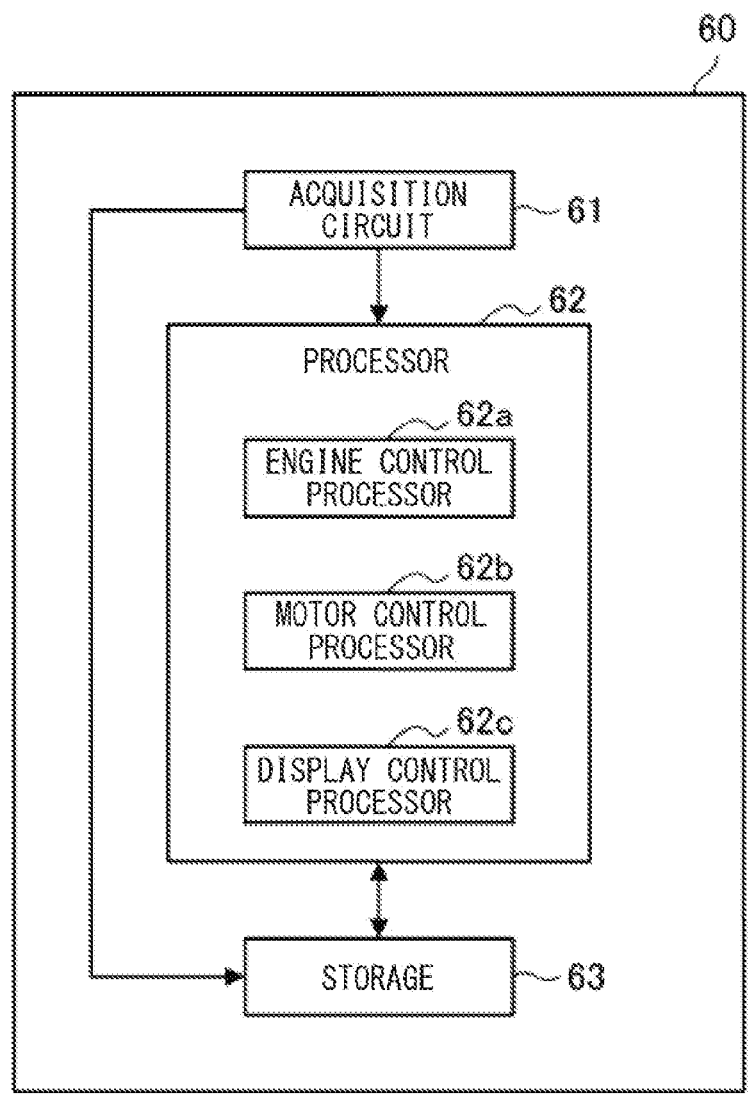
FIG. 3 is a block diagram illustrating an example of a configuration of a control apparatus according to one example embodiment of the technology.

FIG. 3 is a block diagram illustrating an example of a configuration of the control apparatus 60. Referring to FIG. 3, the control apparatus 60 includes a processor 62, for example. The control apparatus 60 may also include an acquisition circuit 61 and a storage 63.

The acquisition circuit 61 may acquire various pieces of data to be used in a process to be performed by the processor 62. The acquisition circuit 61 may output the acquired pieces of data to the processor 62 and the storage 63. For example, the acquisition circuit 61 may acquire the pieces of data from the vehicle speed sensor 51, the engine rotational speed sensor 52, and the gradient sensor 53.

The processor 62 may control an operation of each device in the vehicle 1. For example, the processor 62 may include an engine control processor 62a, a motor control processor 62b, and a display control processor 62c.

The engine control processor 62a may control an operation of the engine 11. For example, the engine control processor 62a may control an operation of each device in the engine 11 to control a throttle position, ignition timing, a fuel injection quantity, etc. The engine control processor 62a may thereby control an output of the engine 11.

The motor control processor 62b may control an operation of each of the first motor generator 21 and the second motor generator 23. For example, the motor control processor 62b may control an operation of a switching device of the first inverter 22 to control a supply of electric power performed between the first motor generator 21 and the battery 25. The motor control processor 62b may thereby control the motive power generation and the electric power generation performed by the first motor generator 21. Further, the motor control processor 62b may control an operation of a switching device of the second inverter 24 to control a supply of electric power performed between the second motor generator 23 and the battery 25. The motor control processor 62b may thereby control the motive power generation and the electric power generation performed by the second motor generator 23.

The display control processor 62c may control an operation of the display 41. For example, the display control processor 62c may cause the display 41 to display various pieces of information or to stop displaying. The display control processor 62c may thereby provide the driver with the various pieces of information.

The storage 63 may store the various pieces of data to be used in the process to be performed by the processor 62.

For example, the storage 63 may store a plurality of brake specific fuel consumption (BSFC) maps. The BSFC maps each illustrate a distribution of BSFC [g/kwh] on a plane with engine rotational speed [rpm] on the horizontal axis and engine torque [Nm] on the vertical axis. The engine rotational speed is a rotational speed of the engine 11. The engine torque is a torque of the engine 11. The BSFC maps to be stored in the storage 63 may correspond to BSFC map candidates to be described later. Among the plurality of BSFC maps, a BSFC map to be used by the processor 62 may be stored as a usable BSFC map by the storage 63.

Further, for example, the storage 63 may store a target operating line corresponding to the usable BSFC map. The target operating line is an operating line to be a control target among operating lines each connecting operating points of the engine 11 on the BSFC map. The operating points are points that each indicate an engine rotational speed and an engine torque on a plane with engine rotational speed on the horizontal axis and engine torque on the vertical axis, such as a BSFC map.

Further, for example, the storage 63 may store traveling characteristic data that indicates a traveling characteristic in the past of the vehicle 1 driven by the driver. The traveling characteristic data may be data to be acquired by any of the sensors in the vehicle 1, including the vehicle speed sensor 51, the engine rotational speed sensor 52, and the gradient sensor 53, may be data to be generated by the processor 62, or may be data to be transmitted to the vehicle 1 from outside the vehicle 1. Details of the traveling characteristic data will be described later.

Here, the processor 62 is able to change a fuel consumption characteristic of the engine 11. The processor 62, or the engine control processor 62a, for example, is able to change the fuel consumption characteristic, i.e., a BSFC characteristic, by controlling the operation of each device in the engine 11. For example, the processor 62 may perform control, such as compression ratio control on a cylinder of the engine 11, opening and closing timing control on an intake and exhaust valve, or cylinder deactivation control, to thereby change the fuel consumption characteristic. The processor 62 may change the fuel consumption characteristic to allow the distribution of the BSFC to become that in the usable BSFC map. The fuel consumption characteristic of the engine 11 may therefore change upon rewriting of the usable BSFC map stored in the storage 63.

Further, the processor 62 controls the operating point of the engine 11 on the basis of the fuel consumption characteristic of the engine 11. The processor 62 may control the operating point of the engine 11 to pass through the target operating line corresponding to the usable BSFC map. Therefore, the operating line through which the operating point of the engine 11 actually passes may change upon rewriting of the target operating line stored in the storage 63. It is possible for the processor 62 to control the operating point of the engine 11 by controlling respective operations of the first motor generator 21 and the second motor generator 23. As described above, the respective rotational speeds of the engine 11, the first motor generator 21, and the second motor generator 23 are in a collinearly aligned relationship with each other in a collinear chart. Therefore, for example, the processor 62 may control the rotational speed of the engine 11 by controlling the respective rotational speeds of the first motor generator 21 and the second motor generator 23. This makes it possible to control the operating point of the engine 11.

The control apparatus 60 may communicate with each device in the vehicle 1, as described above. The communication to be performed between the control apparatus 60 and each device may be a controller area network (CAN) communication, for example.

Note that a plurality of block components of the control apparatus 60 according to an example embodiment may be divided by a plurality of control apparatuses to be executed by the plurality of control apparatuses. Alternatively, the plurality of block components may be executed by a single control apparatus. In some embodiments where the plurality of block components of the control apparatus 60 is divided by the plurality of control apparatuses to be executed by the plurality of control apparatuses, the plurality of apparatuses may be coupled to each other via a communication bus such as the CAN.

According to one embodiment, as described above, the processor 62 of the control apparatus 60 controls the operating point of the engine 11 on the basis of the fuel consumption characteristic of the engine 11. Here, the processor 62 changes the fuel consumption characteristic of the engine 11 on the basis of the traveling characteristic data indicating the traveling characteristic in the past of the vehicle 1 driven by the driver. It is thereby possible to improve the energy efficiency of the vehicle 1. Such a process to be performed by the control apparatus 60 will be described in detail later.

[Operation of Control Apparatus]

With reference to FIGS. 4 to 14, a description will be given of an operation of the control apparatus 60 according to an example embodiment of the technology.

Figure 4:
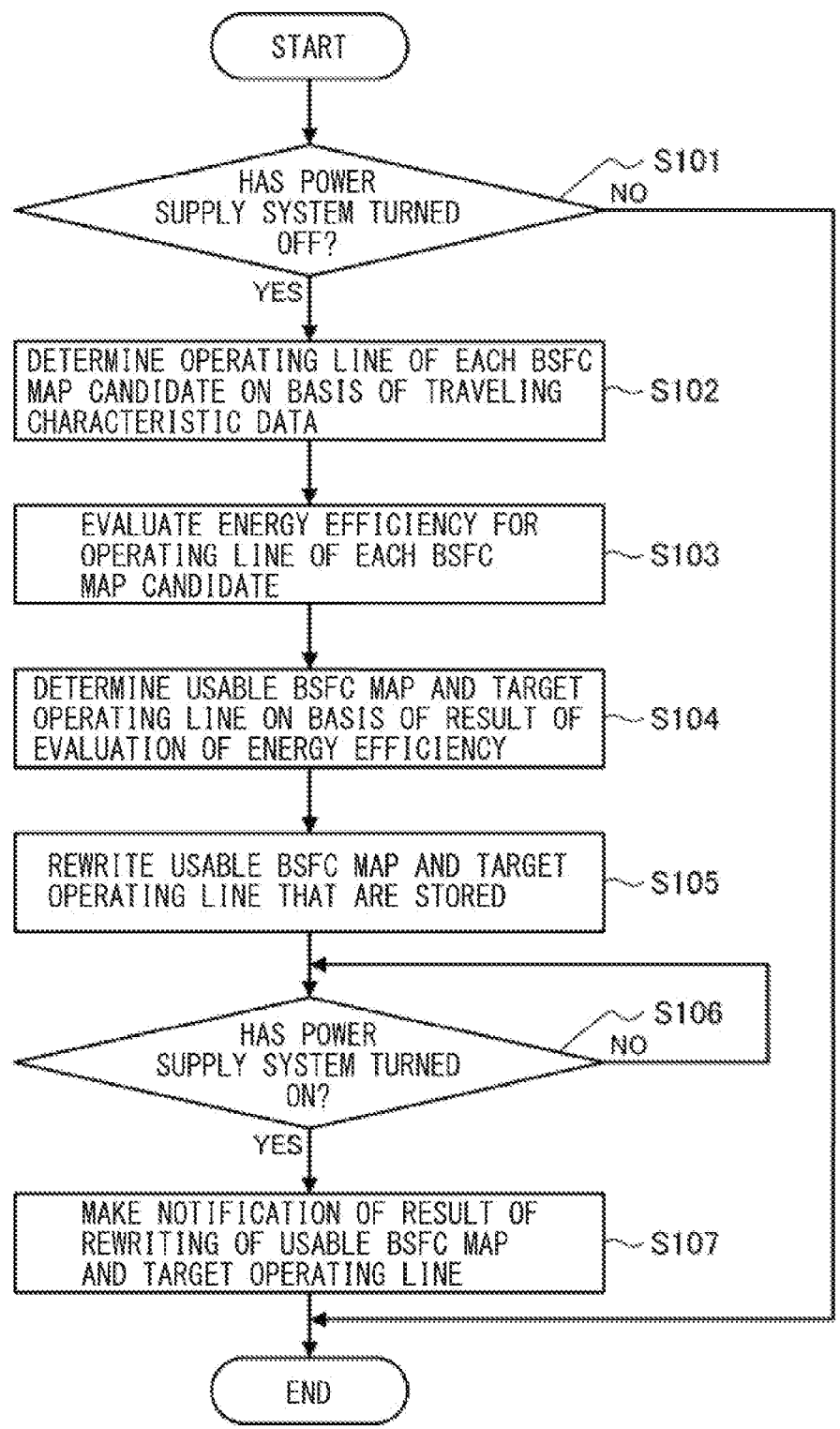
FIG. 4 is a flowchart illustrating an example of a flow of a process to be performed by the control apparatus according to one example embodiment of the technology.

FIG. 4 is a flowchart illustrating an example of a flow of the process to be performed by the control apparatus 60. Note that a control flow illustrated in FIG. 4 may be repeated at predetermined time intervals, for example.

Upon start of the control flow illustrated in FIG. 4, in step S101, the processor 62 may first determine whether a power supply system of the vehicle 1 has turned off. The processor 62 may determine that the power supply system has turned off if a signal indicating a READY OFF state is outputted from an ignition switch. If the processor 62 determines that the power supply system has turned off (step S101: YES), the processor 62 may cause the control flow to proceed to step S102. If the processor 62 determines that the power supply system has not turned off (step S101: NO), the processor 62 may cause the control flow illustrated in FIG. 4 to end.

If the processor 62 makes the YES determination in step S101, the processor 62 may, in step S102, determine the operating line of each of the BSFC map candidates on the basis of the traveling characteristic data. The BSFC map candidates may be BSFC maps that are stored in the storage 63, for example.

As described above, the traveling characteristic data indicates the traveling characteristic in the past of the vehicle 1 driven by the driver. The following will describe an example of using a history of an output of the vehicle 1 as the traveling characteristic. However, examples of the traveling characteristic are not limited thereto, as will be described later.

Figure 7:
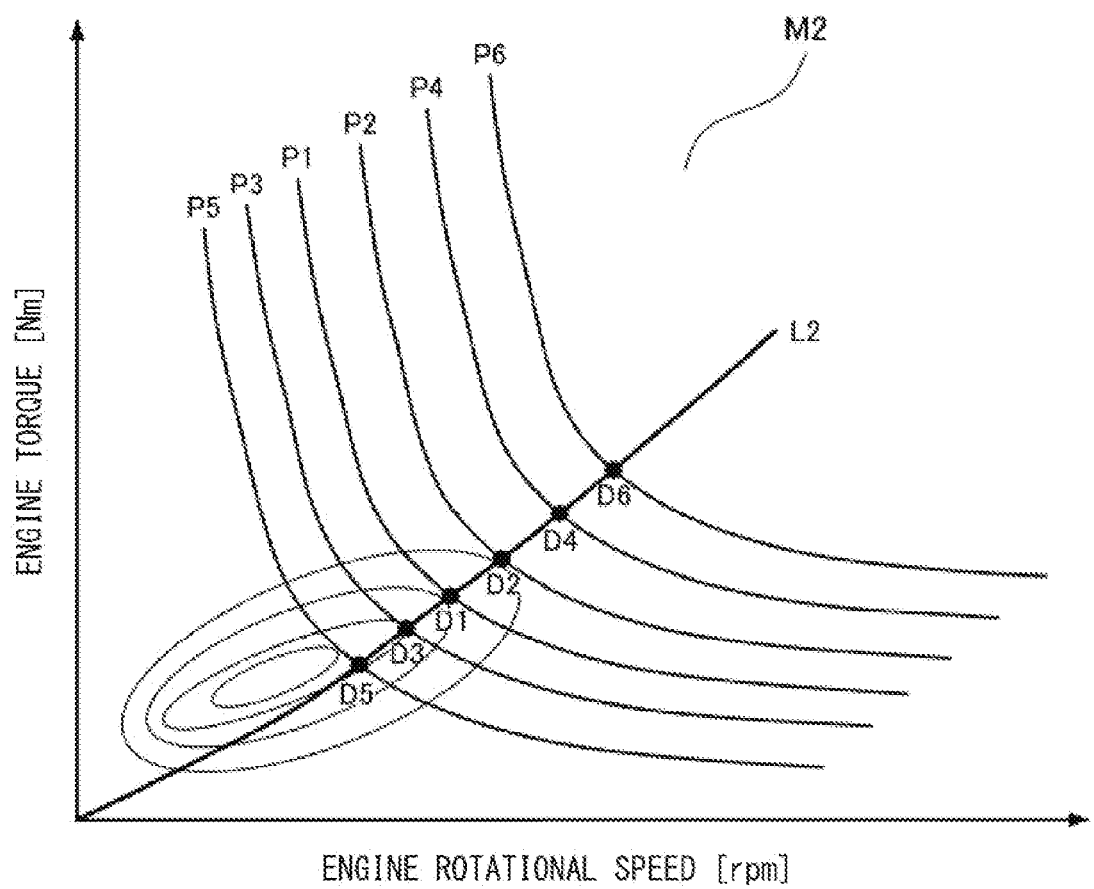
FIG. 7 illustrates an operating line to be determined for a second BSFC map candidate in the case where the history of the output corresponds to the first example.
Figure 8:
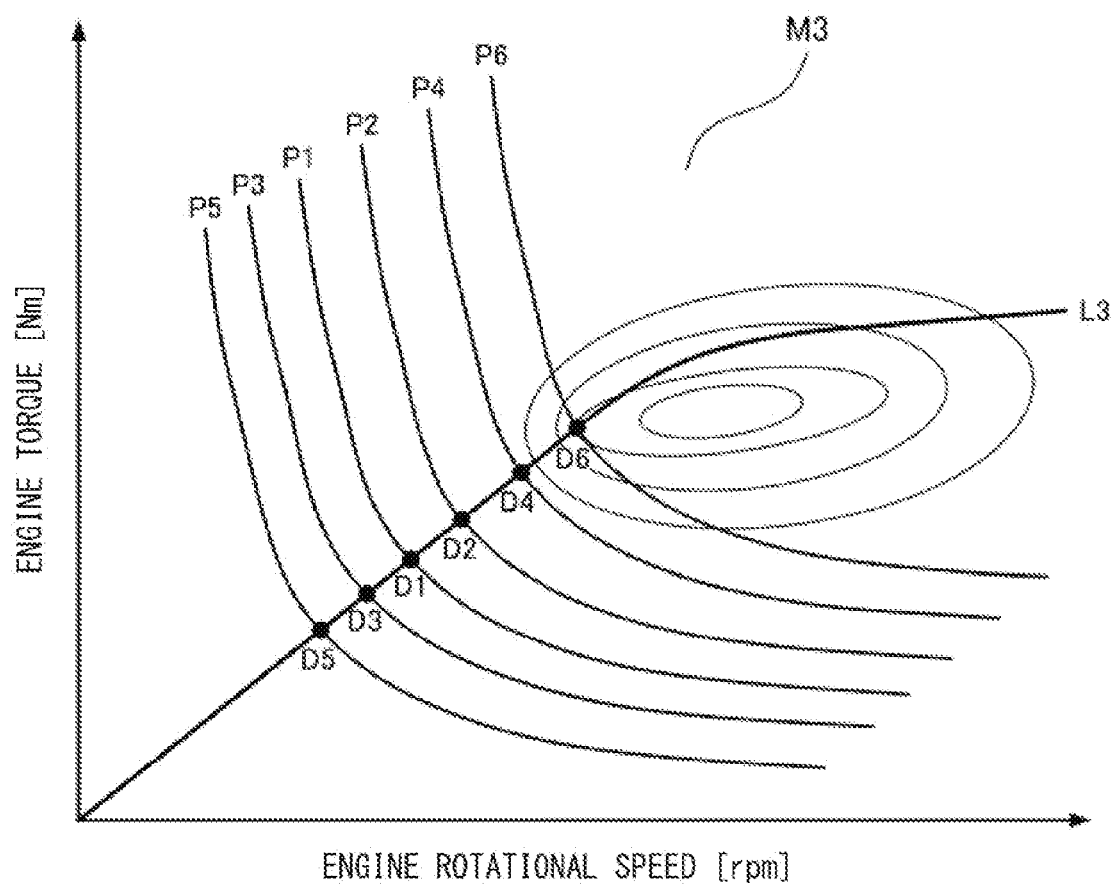
FIG. 8 illustrates an operating line to be determined for a third BSFC map candidate in the case where the history of the output corresponds to the first example.
Figure 11:
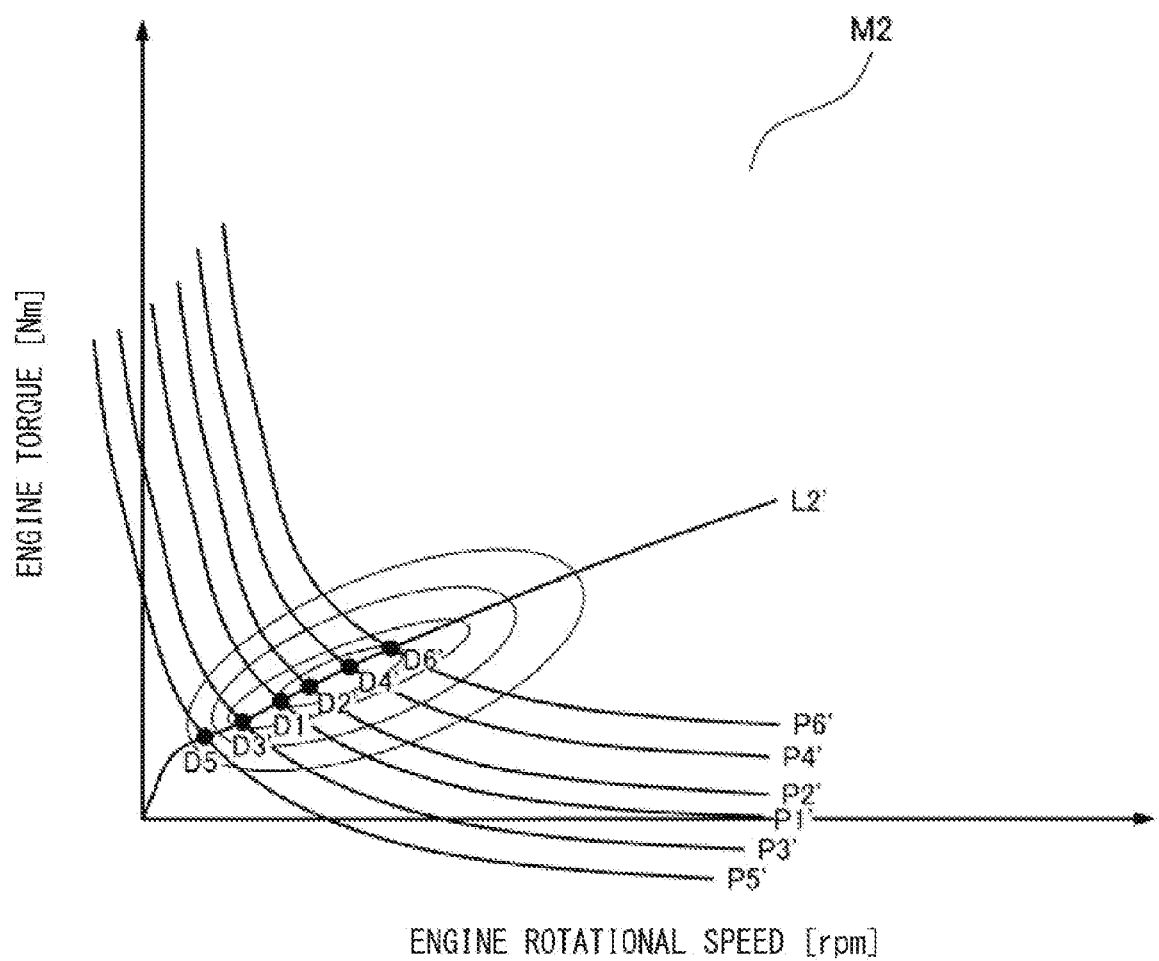
FIG. 11 illustrates an operating line to be determined for the second BSFC map candidate in the case where the history of the output corresponds to the second example.
Figure 12:
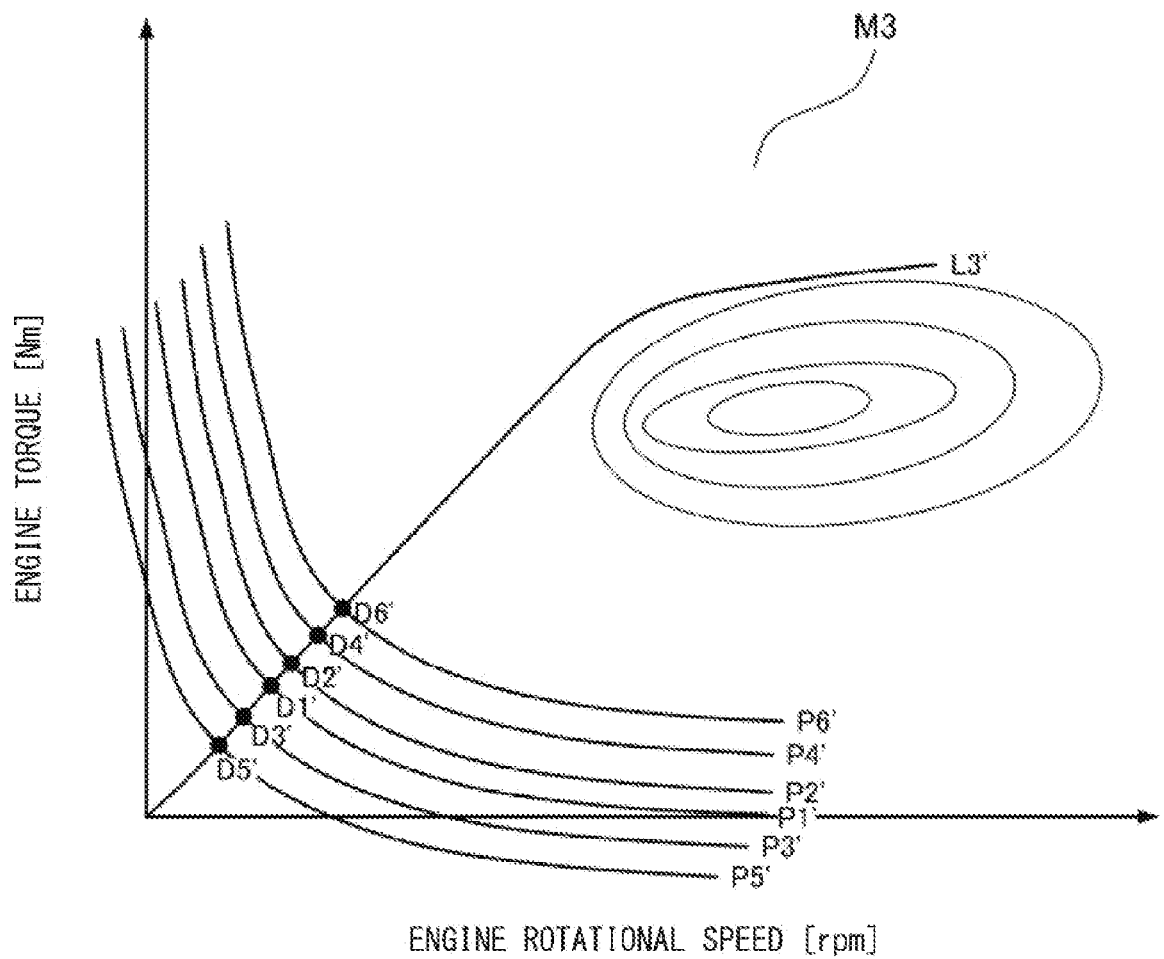
FIG. 12 illustrates an operating line to be determined for the third BSFC map candidate in the case where the history of the output corresponds to the second example.

Further, the following will describe an example of using three BSFC map candidates including a first BSFC map candidate M1 (see FIG. 6 or 10), a second BSFC map candidate M2 (see FIG. 7 or 11), and a third BSFC map candidate M3 (see FIG. 8 or 12). However, the number of the BSFC map candidates and distributions of the BSFC to be illustrated in the BSFC map candidates are not limited to such an example.

Figure 5:
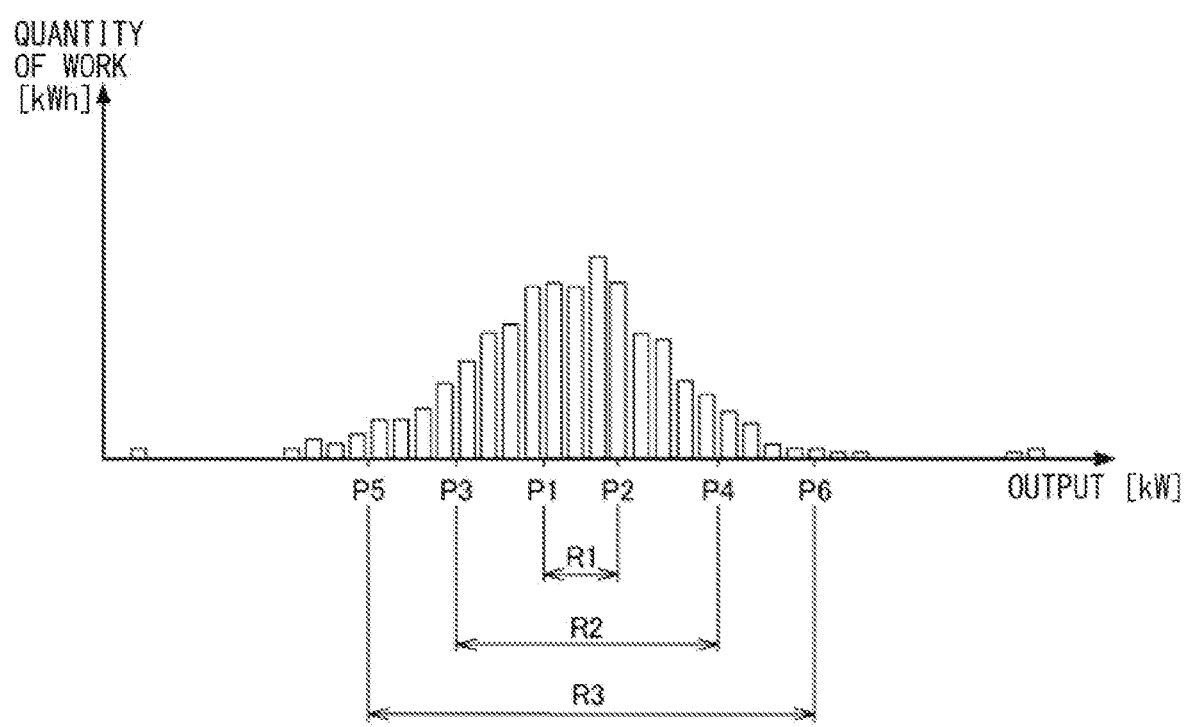
FIG. 5 illustrates a first example of a history of an output of the vehicle.

FIG. 5 illustrates a first example of the history of the output of the vehicle 1. In FIG. 5, the horizontal axis represents output of the vehicle 1, and the vertical axis represents quantity of work resulting from the output of the vehicle 1. Note that the output on the horizontal axis in FIG. 5 may be that of the vehicle 1 as a whole, that is, for example, a sum of the output of the engine 11 and the output of the second motor generator 23. The history of the output illustrated in FIG. 5 may be a history over a predetermined period in the past. The predetermined period may be, for example and not limited to, about one month in the past. The traveling characteristic illustrated in FIG. 5 is derivable from data indicating frequency for each output of the vehicle 1. The first example illustrated in FIG. 5 corresponds to a history of the output that is assumed for a case of driving by an average driver.

Figure 6:
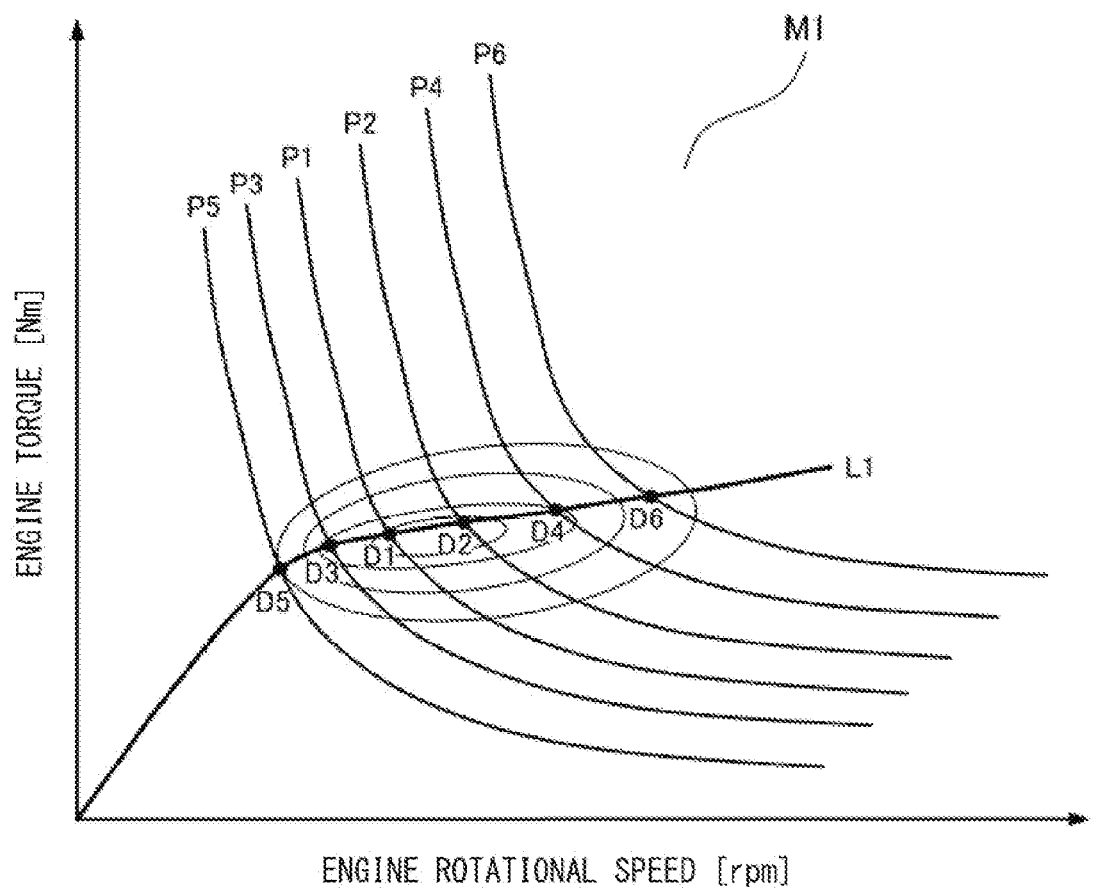
FIG. 6 illustrates an operating line to be determined for a first BSFC map candidate in a case where the history of the output corresponds to the first example.

FIGS. 6, 7, and 8 respectively illustrate an operating line L1, an operating line L2, and an operating line L3 that may be determined for the first BSFC map candidate M1, the second BSFC map candidate M2, and the third BSFC map candidate M3, respectively, in a case where the history of the output corresponds to the first example illustrated in FIG. 5.

The first BSFC map candidate M1, the second BSFC map candidate M2, and the third BSFC map candidate M3 each illustrate contour lines of BSFC. The closer to the center of the contour lines, the smaller is the value of the BSFC. In the second BSFC map candidate M2, the BSFC is low on a lower rotational speed and lower torque side than in the first BSFC map candidate M1. In the third BSFC map candidate M3, the BSFC is low on a higher rotational speed and higher torque side than in the first BSFC map candidate M1.

A description will be given of a process of determining the operating line L1 of the first BSFC map candidate M1 in the case where the history of the output corresponds to the first example illustrated in FIG. 5.

First, the processor 62 may determine a representative output on the basis of the history of the output illustrated in FIG. 5. For example, the processor 62 may determine, in the history of the output illustrated in FIG. 5, three output ranges R1, R2, and R3 each centered at a weighted average of the outputs weighted by the quantity of work. The output ranges R1, R2, and R3 may be ranges that respectively include, for example, 30 percent, 80 percent, and 90 percent of the entire quantity of work. The processor 62 may determine a lower limit of the output range R1 as a representative output P1, and an upper limit of the output range R1 as a representative output P2. The processor 62 may determine a lower limit of the output range R2 as a representative output P3, and an upper limit of the output range R2 as a representative output P4. The processor 62 may determine a lower limit of the output range R3 as a representative output P5, and an upper limit of the output range R3 as a representative output P6.

Thereafter, as illustrated in FIG. 6, on respective curves representing the representative outputs P1, P2, P3, P4, P5, and P6 on the first BSFC map candidate M1, the processor 62 may extract operating points D1, D2, D3, D4, D5, and D6 at which the BSFC is lowest. The processor 62 may thereafter determine the operating line L1 that passes though the operating points D1, D2, D3, D4, D5, and D6 on the first BSFC map candidate M1. In the first example, on the first BSFC map candidate M1, all of the curves representing the representative outputs P1, P2, P3, P4, P5, and P6 pass through a portion in which the contour lines of the BSFC are illustrated, that is, a portion in which the BSFC is low in the entire map. The operating line L1 may thus be determined to allow the BSFC to be low at the representative outputs P1, P2, P3, P4, P5, and P6.

Neither of a method of determining the representative outputs and the number of the representative outputs is limited to the above-described example. Therefore, neither of a method of determining the operating points and the number of the operating points to be used in determining the operating line L1 is limited to the above-described example.

In the case where the history of the output corresponds to the first example illustrated in FIG. 5, the processor 62 may determine the operating lines L2 and L3 respectively for the second BSFC map candidate M2 and the third BSFC map candidate M3 through a process similar to the above-described process.

As illustrated in FIG. 7, on the respective curves representing the representative outputs P1, P2, P3, P4, P5, and P6 on the second BSFC map candidate M2, the processor 62 may extract the operating points D1, D2, D3, D4, D5, and D6 at which the BSFC is lowest. The processor 62 may thereafter determine the operating line L2 that passes though the operating points D1, D2, D3, D4, D5, and D6 on the second BSFC map candidate M2. In the first example, on the second BSFC map candidate M2, only some of the curves representing the representative outputs P1, P2, P3, P4, P5, and P6 pass through a portion in which the contour lines of the BSFC are illustrated. The operating line L2 may thus be determined to allow the BSFC to be higher at the representative outputs P1, P2, P3, P4, P5, and P6 than in the example of FIG. 6.

As illustrated in FIG. 8, on the respective curves representing the representative outputs P1, P2, P3, P4, P5, and P6 on the third BSFC map candidate M3, the processor 62 may extract the operating points D1, D2, D3, D4, D5, and D6 at which the BSFC is lowest. The processor 62 may thereafter determine the operating line L3 that passes though the operating points D1, D2, D3, D4, D5, and D6 on the third BSFC map candidate M3. In the first example, on the third BSFC map candidate M3, only some of the curves representing the representative outputs P1, P2, P3, P4, P5, and P6 pass through a portion in which the contour lines of the BSFC are illustrated. The operating line L3 may thus be determined to allow the BSFC to be higher at the representative outputs P1, P2, P3, P4, P5, and P6 than in the example of FIG. 6.

Figure 9:
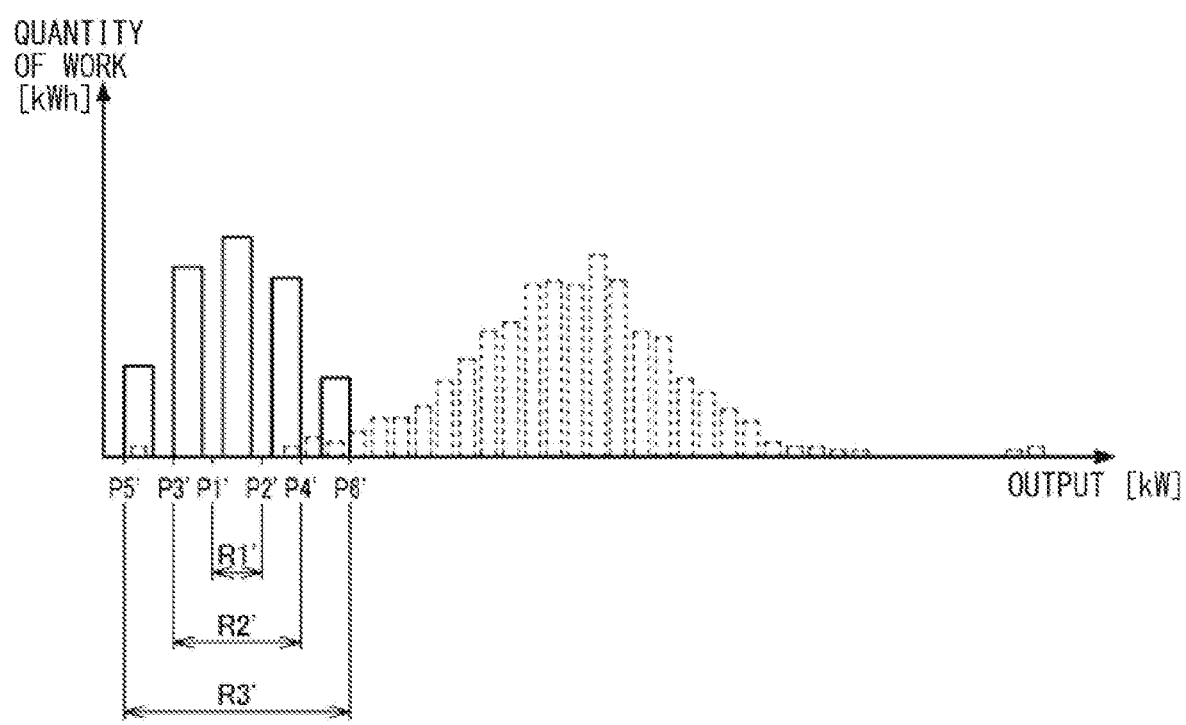
FIG. 9 illustrates a second example of the history of the output of the vehicle.

FIG. 9 illustrates a second example of the history of the output of the vehicle 1. In FIG. 9, the horizontal axis represents the output of the vehicle 1, and the vertical axis represents the quantity of work resulting from the output of the vehicle 1, as in FIG. 5. In FIG. 9, the history of the output illustrated in FIG. 5 is illustrated in broken lines. The second example illustrated in FIG. 9 corresponds to a history of the output that is assumed for a case of driving by a driver who drives with high frequency of travel on a low torque side, as compared with the average driver. Examples of the driver who drives with high frequency of travel on the low torque side include a driver who often drives on a city road.

Figure 10:
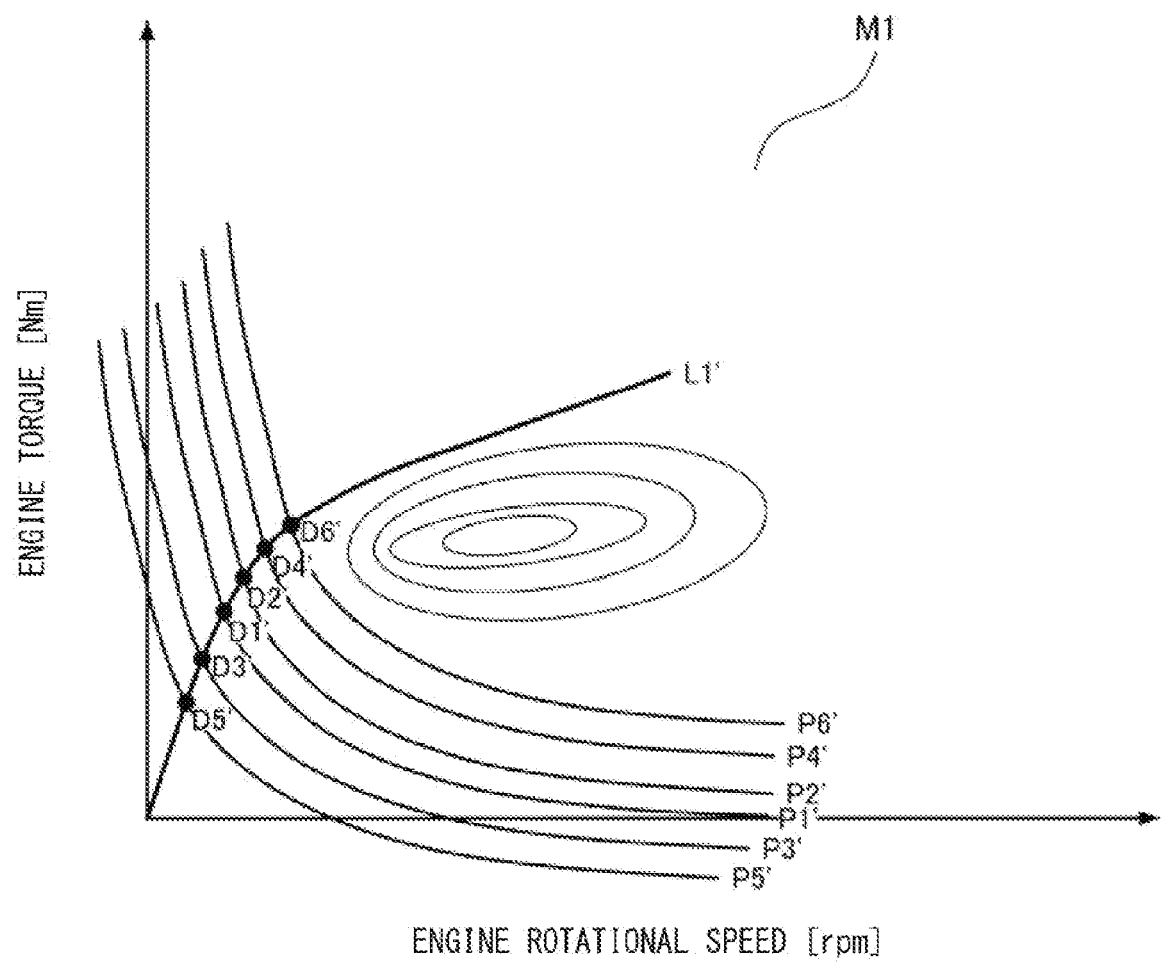
FIG. 10 illustrates an operating line to be determined for the first BSFC map candidate in a case where the history of the output corresponds to the second example.

FIGS. 10, 11, and 12 respectively illustrate operating lines L1', L2', and L3' that may be determined for the first BSFC map candidate M1, the second BSFC map candidate M2, and the third BSFC map candidate M3, respectively, in a case where the history of the output corresponds to the second example illustrated in FIG. 9.

In the case where the history of the output corresponds to the second example illustrated in FIG. 9, the processor 62 may determine the operating lines L1', L2', and L3' respectively for the first BSFC map candidate M1, the second BSFC map candidate M2, and the third BSFC map candidate M3 through a process similar to that in the first example described above.

First, the processor 62 may determine the representative outputs on the basis of the history of the output illustrated in FIG. 9. For example, the processor 62 may determine, in the history of the output illustrated in FIG. 9, three ranges that include 30 percent, 80 percent, and 90 percent of the entire quantity of work as output ranges R1', R2', and R3', respectively, as in the first example. The processor 62 may determine a lower limit of the output range R1' as a representative output P1', and an upper limit of the output range R1' as a representative output P2'. The processor 62 may determine a lower limit of the output range R2' as a representative output P3', and an upper limit of the output range R2' as a representative output P4'. The processor 62 may determine a lower limit of the output range R3' as a representative output P5', and an upper limit of the output range R3' as a representative output P6'.

As illustrated in FIG. 10, on respective curves representing the representative outputs P1', P2', P3', P4', P5', and P6' on the first BSFC map candidate M1, the processor 62 may extract operating points D1', D2', D3', D4', D5', and D6' at which the BSFC is lowest. The processor 62 may thereafter determine the operating line L1' that passes though the operating points D1', D2', D3', D4', D5', and D6' on the first BSFC map candidate M1. In the second example, on the first BSFC map candidate M1, none of the curves representing the representative outputs P1', P2', P3', P4', P5', and P6' passes through a portion in which the contour lines of the BSFC are illustrated. The operating line L1' may thus be determined to allow the BSFC to be higher at the representative outputs P1', P2', P3', P4', P5', and P6' than in an example of FIG. 11 described later.

As illustrated in FIG. 11, on the respective curves representing the representative outputs P1', P2', P3', P4', P5', and P6' on the second BSFC map candidate M2, the processor 62 may extract the operating points D1', D2', D3', D4', D5', and D6' at which the BSFC is lowest. The processor 62 may thereafter determine the operating line L2' that passes though the operating points D1', D2', D3', D4', D5', and D6' on the second BSFC map candidate M2. In the second example, on the second BSFC map candidate M2, all of the curves representing the representative outputs P1', P2', P3', P4', P5', and P6' pass through a portion in which the contour lines of the BSFC are illustrated. The operating line L2' may thus be determined to allow the BSFC to be low at the representative outputs P1', P2', P3', P4', P5', and P6'.

As illustrated in FIG. 12, on the respective curves representing the representative outputs P1', P2', P3', P4', P5', and P6' on the third BSFC map candidate M3, the processor 62 may extract the operating points D1', D2', D3', D4', D5', and D6' at which the BSFC is lowest. The processor 62 may thereafter determine the operating line L3' that passes though the operating points D1', D2', D3', D4', D5', and D6' on the third BSFC map candidate M3. In the second example, on the third BSFC map candidate M3, none of the curves representing the representative outputs P1', P2', P3', P4', P5', and P6' passes through a portion in which the contour lines of the BSFC are illustrated. The operating line L3' may thus be determined to allow the BSFC to be higher at the representative outputs P1', P2', P3', P4', P5', and P6' than in the example of FIG. 11.

Figure 13:
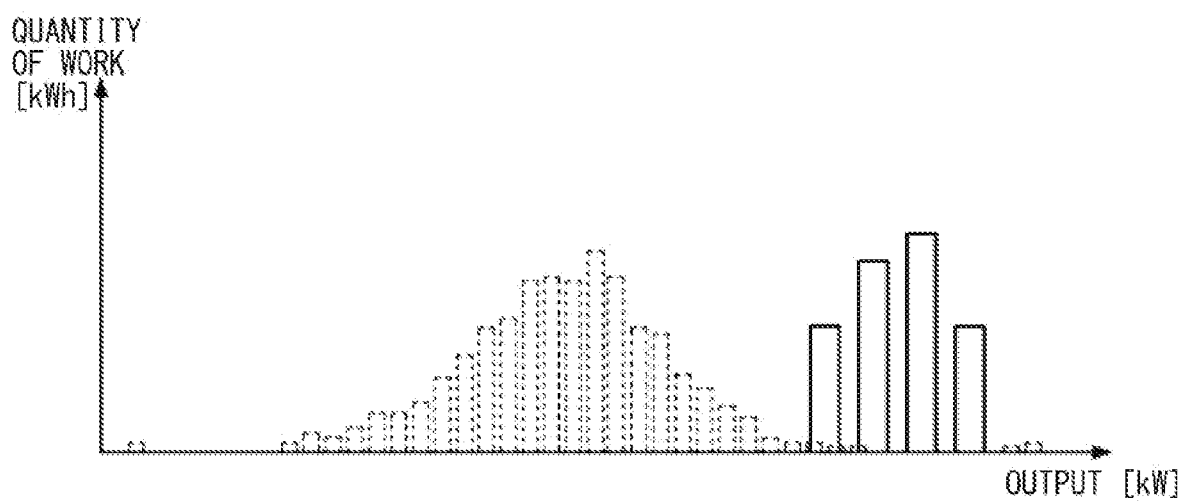
FIG. 13 illustrates a third example of the history of the output of the vehicle.

FIG. 13 illustrates a third example of the history of the output of the vehicle 1. In FIG. 13, the horizontal axis represents the output of the vehicle 1, and the vertical axis represents the quantity of work resulting from the output of the vehicle 1, as in FIG. 5. In FIG. 13, the history of the output illustrated in FIG. 5 is illustrated in broken lines. The third example illustrated in FIG. 13 corresponds to a history of the output that is assumed for a case of driving by a driver who drives with high frequency of travel on a high torque side, as compared with the average driver. Examples of the driver who drives with high frequency of travel on the high torque side include a driver who often drives on an expressway or an uphill road.

In the case where the history of the output corresponds to the third example illustrated in FIG. 13, the processor 62 may determine respective operating lines for the first BSFC map candidate M1, the second BSFC map candidate M2, and the third BSFC map candidate M3 through a process similar to those in each of the first example and the second example described above. Details of the process of determining the operating line of each BSFC map candidate are similar to the examples described above, and therefore a description thereof will be omitted.

In the third example, on the third BSFC map candidate M3, most of the curves representing the representative outputs pass through a portion in which the contour lines of the BSFC are illustrated. The operating line may thus be determined to allow the BSFC to be low at the representative outputs. In contrast, the first BSFC map candidate M1 and the second BSFC map candidate M2 are each smaller than the third BSFC map candidate M3 in the number of the curves that pass through the portion in which the contour lines of the BSFC are illustrated, among the curves representing the representative outputs. For each of the first and second BSFC map candidates M1 and M2, the operating line may thus be determined to allow the BSFC to be higher at the representative outputs than in the third BSFC map candidate M3.

Following step S102 in FIG. 4, the processor 62 may, in step S103, evaluate energy efficiency for the operating line of each of the BSFC map candidates.

For the operating line of each of the BSFC map candidates, for example, the processor 62 may calculate an average value of energy efficiencies at the representative outputs using a numerical analysis simulation. In the numerical analysis simulation, energy efficiency in the vehicle 1 as a whole is calculated with fuel consumption, electric power consumption, mechanical losses in drive portions, etc. factored in. In this way, in evaluating the energy efficiency of the operating line, electric power consumption as well as fuel consumption may be factored in from the viewpoint of accurately calculating the energy efficiency in the vehicle 1 as a whole.

A description will be given of the evaluation of energy efficiency for the operating line of each of the BSFC map candidates in the first example of the history of the output illustrated in FIG. 5. Note that the process of evaluating energy efficiency in each of the second example of the history of the output illustrated in FIG. 9 and the third example of the history of the output illustrated in FIG. 13 is similar to that in the first example illustrated in FIG. 5, and therefore a description thereof is omitted.

For example, the processor 62 may calculate energy efficiency for each of the operating points D1, D2, D3, D4, D5, and D6 on the operating line L1 of the first BSFC map candidate M1 illustrated in FIG. 6. The processor 62 may thereafter determine an average value of the energy efficiencies calculated for the operating points as an evaluation value of energy efficiency of the operating line L1 of the first BSFC map candidate M1. In a similar manner, the processor 62 may determine an evaluation value of energy efficiency of the operating line L2 of the second BSFC map candidate M2 illustrated in FIG. 7 and an evaluation value of energy efficiency of the operating line L3 of the third BSFC map candidate M3 illustrated in FIG. 8.

Following step S103 in FIG. 4, the processor 62 may, in step S104, determine the usable BSFC map and the target operating line on the basis of a result of the evaluation of energy efficiency. The usable BSFC map may be determined from among a plurality of BSFC map candidates.

For example, the processor 62 may determine, as the usable BSFC map, a BSFC map candidate including an operating line that is the highest in evaluation value of energy efficiency determined in step S103. Further, the processor 62 may determine, as the target operating line, the operating line of the BSFC map candidate determined as the usable BSFC map.

In the first example of the history of the output illustrated in FIG. 5, as described above, the operating line L1 may be determined in the first BSFC map candidate M1 to allow the BSFC at the representative outputs P1, P2, P3, P4, P5, and P6 to be lower than in the second BSFC map candidate M2 and the third BSFC map candidate M3. Therefore, the operating line L1 of the first BSFC map candidate M1 may be higher in evaluation value of energy efficiency than the operating line L2 of the second BSFC map candidate M2 and the operating line L3 of the third BSFC map candidate M3. The processor 62 may thus determine the first BSFC map candidate M1 as the usable BSFC map from among the first BSFC map candidate M1, the second BSFC map candidate M2, and the third BSFC map candidate M3. Further, the processor 62 may determine the operating line L1 as the target operating line.

In the second example of the history of the output illustrated in FIG. 9, as described above, the operating line L2' may be determined in the second BSFC map candidate M2 to allow the BSFC at the representative outputs P1', P2', P3', P4', P5', and P6' to be lower than in the first BSFC map candidate M1 and the third BSFC map candidate M3. Therefore, the operating line L2' of the second BSFC map candidate M2 may be higher in evaluation value of energy efficiency than the operating line L1' of the first BSFC map candidate M1 and the operating line L3' of the third BSFC map candidate M3. The processor 62 may thus determine the second BSFC map candidate M2 as the usable BSFC map. Further, the processor 62 may determine the operating line L2' as the target operating line.

In the third example of the history of the output illustrated in FIG. 13, as described above, the operating line may be determined in the third BSFC map candidate M3 to allow the BSFC at the representative outputs to be lower than in the first BSFC map candidate M1 and the second BSFC map candidate M2. Therefore, the operating line of the third BSFC map candidate M3 may be higher in evaluation value of energy efficiency than the operating line of the first BSFC map candidate M1 and the operating line of the second BSFC map candidate M2. The processor 62 may thus determine the third BSFC map candidate M3 as the usable BSFC map. Further, the processor 62 may determine the operating line of the third BSFC map candidate M3 as the target operating line.

Following step S104 in FIG. 4, the processor 62 may, in step S105, rewrite the usable BSFC map and the target operating line stored in the storage 63 to the usable BSFC map and the target operating line determined in step S104. This changes the fuel consumption characteristic of the engine 11 to allow the distribution of the BSFC to become that illustrated in the usable BSFC map after rewriting. Further, this causes a path of the operating point of the engine 11 to change to pass through the target operating line after rewriting.

Thereafter, in step S106, the processor 62 may determine whether the power supply system of the vehicle 1 has turned on. For example, the processor 62 may determine that the power supply system has turned on if a signal indicating a READY ON state is outputted from the ignition switch. If the processor 62 determines that the power supply system has turned on (step S106: YES), the processor 62 may cause the control flow to proceed to step S107. If the processor 62 determines that the power supply system has not turned on (step S106: NO), the processor 62 may repeat the process of step S106.

If the processor 62 makes the YES determination in step S106, the processor 62 may, in step S107, notify the driver of a result of the rewriting of the usable BSFC map and the target operating line, and cause the control flow illustrated in FIG. 4 to end. For example, the processor 62 may cause the display 41 to display the result of the rewriting of the usable BSFC map and the target operating line.

In the above-described manner, the processor 62 of the control apparatus 60 changes the fuel consumption characteristic of the engine on the basis of the traveling characteristic data indicating the traveling characteristic in the past of the vehicle 1 driven by the driver. This makes it possible to change the fuel consumption characteristic of the engine 11 in accordance with a driver-specific driving style. For example, in a case where the driver of the vehicle 1 is of a type who often drives on a city road, it is possible to employ, as the usable BSFC map, the second BSFC map candidate M2 which allows the BSFC to be low on the low rotational speed and low torque side. Further, for example, in a case where the driver of the vehicle 1 is of a type who often drives on an expressway or an uphill road, it is possible to employ, as the usable BSFC map, the third BSFC map candidate M3 which allows the BSFC to be low on the high rotational speed and high torque side. It is thus possible to improve the energy efficiency of the vehicle 1 in accordance with the traveling characteristic of the vehicle 1 dependent on individual drivers.

In the foregoing, in the evaluation of energy efficiency for the operating line of each BSFC map candidate, the energy efficiency of the operating line is evaluated on the basis of energy efficiencies at the operating points on the operating line. However, the processor 62 may evaluate the energy efficiency of the operating line by using an operating point near the operating line in addition to the operating points on the operating line.

Figure 14:
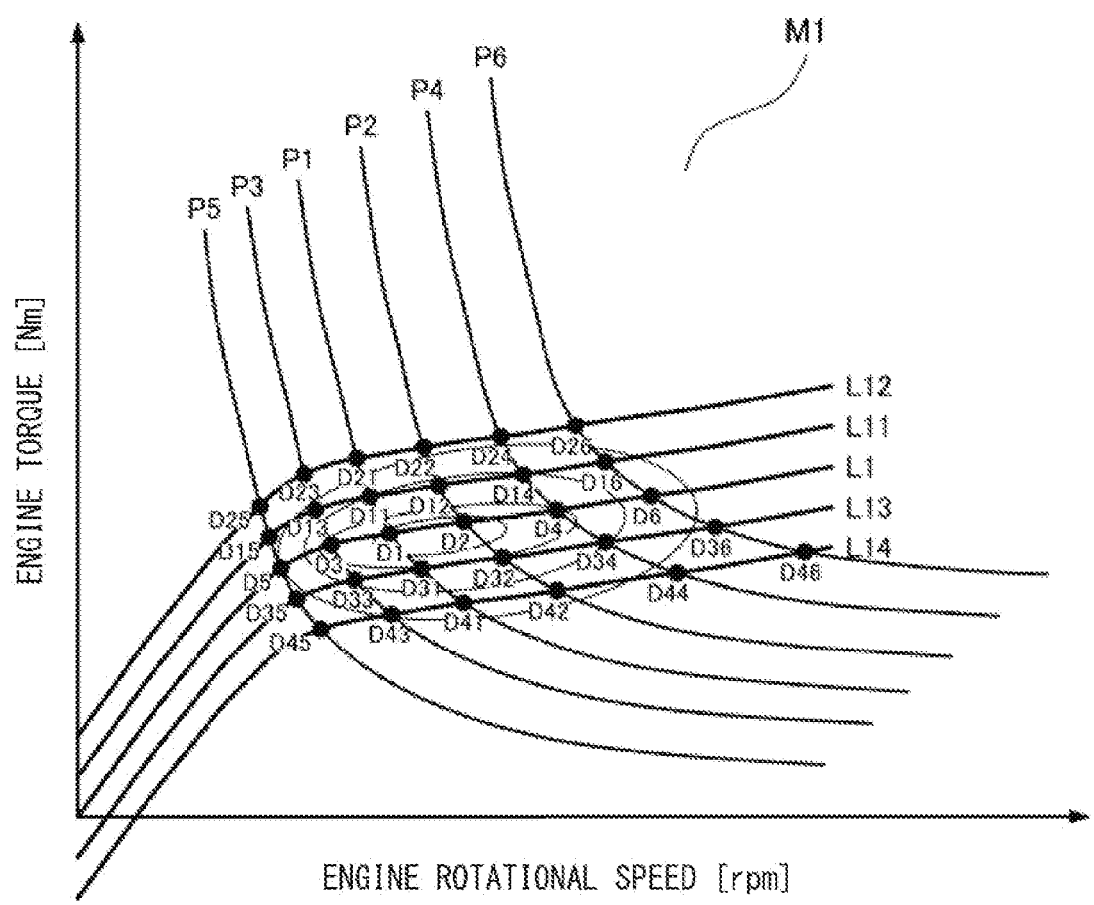
FIG. 14 is a diagram for describing another example of evaluation of energy efficiency for an operating line of a BSFC map candidate.

FIG. 14 is a diagram for describing another example of evaluation of energy efficiency for an operating line of a BSFC map candidate. As one example, FIG. 14 illustrates the operating points D1, D2, D3, D4, D5, and D6 on the operating line L1 of the first BSFC map candidate M1 illustrated in FIG. 6, and operating points D11 to D16, D21 to D26, D31 to D36, and D41 to D46 near the operating line L1. With reference to FIG. 14, a description will be given below of another example of the evaluation of energy efficiency for the operating line L1 of the first BSFC map candidate M1 in the first example of the history of the output illustrated in FIG. 5.

For example, the processor 62 may extract intersection points of an operating line L11 and the curves representing the representative outputs P1, P2, P3, P4, P5, and P6 as operating points D11, D12, D13, D14, D15, and D16, respectively. The operating line L11 is a line resulting from shifting the operating line L1 to a higher torque side by a predetermined torque. Further, the processor 62 may extract intersection points of an operating line L12 and the curves representing the representative outputs P1, P2, P3, P4, P5, and P6 as operating points D21, D22, D23, D24, D25, and D26, respectively. The operating line L12 is a line resulting from shifting the operating line L11 to a higher torque side further by a predetermined torque. Further, the processor 62 may extract intersection points of an operating line L13 and the curves representing the representative outputs P1, P2, P3, P4, P5, and P6 as operating points D31, D32, D33, D34, D35, and D36, respectively. The operating line L13 is a line resulting from shifting the operating line L1 to a lower torque side by a predetermined torque. Further, the processor 62 may extract intersection points of an operating line L14 and the curves representing the representative outputs P1, P2, P3, P4, P5, and P6 as operating points D41, D42, D43, D44, D45, and D46, respectively. The operating line L14 is a line resulting from shifting the operating line L13 to a lower torque side further by a predetermined torque.

The processor 62 may thereafter calculate energy efficiencies for the operating points D11 to D16, D21 to D26, D31 to D36, and D41 to D46, in addition to the operating points D1, D2, D3, D4, D5, D6 on the operating line L1 of the first BSFC map candidate M1. One each of the curves representing the representative outputs P1, P2, P3, P4, P5, and P6, the processor 62 may extract one operating point that is the highest in energy efficiency among the five operating points lying on the curve. The processor 62 may thereafter determine an average value of the energy efficiencies of a total of six operating points, each extracted from a corresponding one of the curves, as an evaluation value of energy efficiency of the operating line L1 of the first BSFC map candidate M1.

After determining the first BSFC map candidate M1 as the usable BSFC map, the processor 62 may determine, as the target operating line, an operating line that passes through the total of six operating points each extracted from a corresponding one of the curves representing the representative outputs P1, P2, P3, P4, P5, and P5. For example, as a result of factoring in the electric power consumption as well as the fuel consumption in the numerical analysis simulation of energy efficiency, there may be a case where energy efficiency is highest at an operating point on an operating line other than the operating line L1 at any of the representative outputs. In such a case, an operating line resulting from replacing some of the operating points on the operating line L1 with those on the foregoing other operating line may be determined as the target operating line. The energy efficiency is thereby further improved.

In the description above, the operating line of each BSFC map candidate may be determined on the basis of the traveling characteristic data, and the usable BSFC map and the target operating line may be determined on the basis of the result of evaluation of energy efficiency for the operating line of each BSFC map candidate. However, the processor 62 may determine the usable BSFC map and the target operating line on the basis of the traveling characteristic data, without performing the process of determining the operating line of each BSFC map candidate or the process of evaluating energy efficiency for the operating line of each BSFC map candidate.

For example, the processor 62 may select and determine the usable BSFC map from among the BSFC map candidates in accordance with the magnitude of the weighted average of the outputs weighted by the quantity of work in the history of the output illustrated in each of FIGS. 5, 9, and 13. Note that in this case, the processor 62 only has to appropriately determine the target operating line that passes through an operating point at which the BSFC is minimized on the determined usable BSFC map. For example, similarly to the example described above, the processor 62 may determine the target operating line that passes through an operating point at which the BSFC is lowest on each of the curves representing the representative outputs. However, the process of determining the target operating line is not limited to the above-described example.

A description has been given above of an example in which data indicating the history of the output of the vehicle 1 may be used as the traveling characteristic data. Thus, the traveling characteristic may include the history of the output of the vehicle 1. However, the traveling characteristic may include a characteristic other than the history of the output of the vehicle 1.

For example, the traveling characteristic may include a history of the rotational speed of the engine 11. Examples of the history of the rotational speed of the engine 11 include frequency for each engine rotational speed.

For example, in a case of driving by a driver who often drives on a city road in a hilly city, the traveling characteristic data may exhibit a tendency for the frequency of travel to be high on the high torque side with the engine rotational speed on a low rotational speed side, as compared with a case of the average driver. In such a case, on the basis of the traveling characteristic data indicating the history of the rotational speed of the engine 11, the processor 62 may employ a BSFC map candidate that allows the BSFC to be low on the low rotational speed and high torque side, as the usable BSFC map. This makes it possible to improve the energy efficiency of the vehicle 1 even in the case where the driver of the vehicle 1 is of a type who often drives on a city road in a hilly city, for example.

Further, for example, in a case where the vehicle 1 is a recreational vehicle, the vehicle 1 may often be driven while pulling a load. In this case, the traveling characteristic data may exhibit a tendency for the frequency of travel to be high on the high torque side with a similar engine rotational speed, as compared with the case of the average driver. In such a case, on the basis of the traveling characteristic data indicating the history of the rotational speed of the engine 11, the processor 62 may employ a BSFC map candidate that allows the BSFC to be low on a middle rotational speed and high torque side, as the usable BSFC map. This makes it possible to improve the energy efficiency of the vehicle 1 even in a case where the driver of the vehicle 1 is of a type who often drives with a load being pulled by the vehicle, for example.

Note that the traveling characteristic may include various characteristics other than the history of the output of the vehicle 1 or the history of the rotational speed of the engine 11. For example, the traveling characteristic may include a history such as a history of the vehicle speed of the vehicle 1 or a history of the gradient of a road on which the vehicle 1 has traveled. The traveling characteristic data may be data indicating a plurality of traveling characteristics or data indicating a single traveling characteristic. Examples of the data indicating a plurality of traveling characteristics include data indicating both of the history of the output of the vehicle 1 and the history of the rotational speed of the engine 11.

A description has been given above, with reference to FIG. 4, about the process related to changing of the fuel consumption characteristic of the engine 11 to be performed by the processor 62. However, the process to be performed by the processor 62 is not limited to the above-described example, and a process not described above may be further performed.

For example, in a case where the vehicle 1 is shared between a plurality of drivers, the driver on board the vehicle 1 can vary. The storage 63 may store the traveling characteristic data for each of the plurality of drivers. In this case, it is possible for the processor 62 to change the fuel consumption characteristic of the engine 11 on the basis of the traveling characteristic data corresponding to relevant one of the drivers. This makes it possible to appropriately improve the energy efficiency of the vehicle 1 even in the case where the driver on board varies.

Note that recognition of the driver on board the vehicle 1 is achievable, for example, by an input operation performed by the driver using an input device, or by using a detection device that detects which driver is on board. Examples of the detection device include a device that is able to perform image processing on an image obtained through imaging of the driver's face.

Further, for example, the driving style of the driver can vary depending on the day of the week. For example, on weekdays, the driver may more often drive on a city road for a purpose such as commuting, whereas on weekends, the driver may more often drive on an expressway or an uphill road to go out farther for recreation purposes. The storage 63 may store the traveling characteristic data for each of the days of the week on which the vehicle 1 has traveled. In this case, it is possible for the processor 62 to change the fuel consumption characteristic of the engine 11 on the basis of the traveling characteristic data corresponding to relevant one of the days of the week. For example, it is possible for the processor 62 to change the fuel consumption characteristic of the engine 11 on the basis of the traveling characteristic data different between a weekday and a weekend. This makes it possible to appropriately improve the energy efficiency of the vehicle 1 even in the case where the driving style of the driver varies depending on the day of the week.

Note that the processor 62 may cause the traveling characteristic data to vary depending on various pieces of information other than those described above. For example, the traveling characteristic data may be stored for each of a plurality of seasons, each of a plurality of months, each of a plurality of weathers, or each of a plurality of temperatures, and the processor 62 may change the fuel consumption characteristic of the engine 11 on the basis of the traveling characteristic data corresponding to relevant one of the seasons, relevant one of the months, relevant one of the weathers, or relevant one of the temperatures.

[Example Effects of Control Apparatus]

Next, a description will be given of some example effects of the control apparatus 60 according to an example embodiment of the technology.

In the control apparatus 60 according to an example embodiment, the processor 62 changes the fuel consumption characteristic of the engine 11 on the basis of the traveling characteristic data indicating the traveling characteristic in the past of the vehicle 1 driven by the driver, and controls the operating point of the engine 11 on the basis of the fuel consumption characteristic. This makes it possible to change the fuel consumption characteristic of the engine 11 in accordance with the driver-specific driving style. It is thus possible to improve the energy efficiency of the vehicle 1.

In one example, in the control apparatus 60 according to an example embodiment, the traveling characteristic may include the history of the output of the vehicle 1. This makes it possible to change the fuel consumption characteristic of the engine 11 in accordance with a tendency of the output corresponding to the driving style of the driver. It is thus possible to appropriately change the fuel consumption characteristic of the engine 11 in accordance with the driver-specific driving style, and consequently, it is possible to appropriately improve the energy efficiency of the vehicle 1.

In one example, in the control apparatus 60 according to an example embodiment, the traveling characteristic may include the history of the rotational speed of the engine 11. This makes it possible to change the fuel consumption characteristic of the engine 11 in accordance with a tendency of the engine rotational speed corresponding to the driving style of the driver. It is thus possible to appropriately change the fuel consumption characteristic of the engine 11 in accordance with the driver-specific driving style, and consequently, it is possible to appropriately improve the energy efficiency of the vehicle 1.

In one example, in the control apparatus 60 according to an example embodiment, the traveling characteristic data may be stored for each of a plurality of drivers of the vehicle 1, and the processor 62 may change the fuel consumption characteristic of the engine 11 on the basis of the traveling characteristic data corresponding to relevant one of the drivers. This makes it possible to appropriately improve the energy efficiency of the vehicle 1 even in the case where the driver on board varies.

In one example, in the control apparatus 60 according to an example embodiment, the traveling characteristic data may be stored for each of the days of the week on which the vehicle 1 has traveled, and the processor 62 may change the fuel consumption characteristic of the engine 11 on the basis of the traveling characteristic data corresponding to relevant one of the days of the week. This makes it possible to appropriately improve the energy efficiency of the vehicle 1 even in the case where the driving style of the driver varies depending on the day of the week.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The processor 62 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 62. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 62 illustrated in FIG. 3.

The invention claimed is:

1. A control apparatus configured to control a vehicle, the vehicle including an engine, a generator configured to generate electric power by using motive power to be outputted from the engine, and a drive motor coupled to a drive wheel, the engine, the generator, and the drive motor being coupled to each other via a planetary gear mechanism, the control apparatus comprising:
storage configured to store a plurality of brake specific fuel consumption (BSFC) map candidates differing from one another; and
a processor configured to:
determine an operating line of each of the BSFC map candidates based on a traveling characteristic in a past of the vehicle driven by a driver who drives the vehicle;
evaluate an energy efficiency value for the operating line of each of the BSFC map candidates;
determine, as a usable BSFC map with a target operating line, a BSFC map with an operating line having a highest energy efficiency value out of the BSFC map candidates;
set a fuel consumption characteristic of the engine based on the target operating line in the usable BSFC map such that an operating point of the engine is controlled by controlling respective operations of the generator and the drive motor based on the usable BSFC map with the target operating line.

2. The control apparatus according to claim 1, wherein the traveling characteristic includes a history of an output of the vehicle.

3. The control apparatus according to claim 1, wherein the traveling characteristic includes a history of a rotational speed of the engine.

4. The control apparatus according to claim 2, wherein the traveling characteristic includes a history of a rotational speed of the engine.

5. The control apparatus according to claim 1, wherein
data of the traveling characteristic is stored for each of a plurality of drivers, and
the processor is configured to change the fuel consumption characteristic of the engine based on the data of the traveling characteristic corresponding to one of the drivers.

6. The control apparatus according to claim 2, wherein
data of the traveling characteristic is stored for each of a plurality of drivers, and
the processor is configured to change the fuel consumption characteristic of the engine based on the data of the traveling characteristic corresponding to one of the drivers.

7. The control apparatus according to claim 3, wherein
data of the traveling characteristic is stored for each of a plurality of drivers, and
the processor is configured to change the fuel consumption characteristic of the engine based on the data of the traveling characteristic corresponding to one of the drivers.

8. The control apparatus according to claim 4, wherein
data of the traveling characteristic is stored for each of a plurality of drivers, and
the processor is configured to change the fuel consumption characteristic of the engine based on the data of the traveling characteristic corresponding to one of the drivers.

9. The control apparatus according to claim 1, wherein
data of the traveling characteristic is stored for each of days of a week on which the vehicle has traveled, and
the processor is configured to change the fuel consumption characteristic of the engine based on the data of the traveling characteristic corresponding to relevant one of the days of the week.

10. The control apparatus according to claim 2, wherein
data of the traveling characteristic is stored for each of days of a week on which the vehicle has traveled, and
the processor is configured to change the fuel consumption characteristic of the engine based on the data of the traveling characteristic corresponding to relevant one of the days of the week.

11. The control apparatus according to claim 3, wherein
data of the traveling characteristic is stored for each of days of a week on which the vehicle has traveled, and
the processor is configured to change the fuel consumption characteristic of the engine based on the data of the traveling characteristic corresponding to relevant one of the days of the week.

12. The control apparatus according to claim 4, wherein
data of the traveling characteristic is stored for each of days of a week on which the vehicle has traveled, and
the processor is configured to change the fuel consumption characteristic of the engine based on the data of the traveling characteristic corresponding to relevant one of the days of the week.

13. The control apparatus according to claim 5, wherein
the data of the traveling characteristic is stored for each of days of a week on which the vehicle has traveled, and the processor is configured to change the fuel consumption characteristic of the engine based on data of the traveling characteristic corresponding to relevant one of the days of the week.

14. The control apparatus according to claim 6, wherein
the data of the traveling characteristic is stored for each of days of a week on which the vehicle has traveled, and
the processor is configured to change the fuel consumption characteristic of the engine based on the data of the traveling characteristic corresponding to relevant one of the days of the week.

15. The control apparatus according to claim 7, wherein
the data of the traveling characteristic is stored for each of days of a week on which the vehicle has traveled, and
the processor is configured to change the fuel consumption characteristic of the engine based on the data of the traveling characteristic corresponding to relevant one of the days of the week.

16. The control apparatus according to claim 8, wherein
the data of the traveling characteristic is stored for each of days of a week on which the vehicle has traveled, and
the processor is configured to change the fuel consumption characteristic of the engine based on the data of the traveling characteristic corresponding to relevant one of the days of the week.

17. A vehicle comprising:
an engine configured to operate in predetermined operating modes, the predetermined operating modes including a first operating mode and a second operating mode;
a generator configured to generate electric power by using motive power to be outputted from the engine;
a drive motor coupled to a drive wheel;
a planetary gear mechanism coupled to the engine, the generator, and the drive motor;
storage configured to store a plurality of brake specific fuel consumption (BSFC) map candidates differing from one another; and
a processor configured to:
  determine an operating line of each of the BSFC map candidates based on a traveling characteristic in a past of the vehicle driven by a driver who drives the vehicle;
  evaluate an energy efficiency value for the operating line of each of the BSFC map candidates;
  determine, as a usable BSFC map with a target operating line, a BSFC map with an operating line having a highest energy efficiency value out of the BSFC map candidates;
  set a fuel consumption characteristic of the engine based on the target operating line in the usable BSFC map such that an operating point of the engine is controlled by controlling respective operations of the generator and the drive motor based on the usable BSFC map with the target operating line.

18. A vehicle comprising:
a storage configured to store a first map and a second map, the first map indicating a first distribution of a BSFC (Brake Specific Fuel Consumption) value on a plane with an engine rotational speed on a horizontal axis and an engine torque on a vertical axis, the second map indicating a second distribution of the BSFC value on the plane, the first distribution being different from the second distribution;
an engine configured to operate in predetermined operating modes, the predetermined operating modes including a first operating mode and a second operating mode, the engine i) having a first fuel consumption characteristic represented by the first map when the engine operates in the first operating mode, and ii) having a second fuel consumption characteristic represented by the second map when the engine operates in the second operating mode, wherein when the engine operates in the first operating mode, at least one of i) compression ratio, ii) opening and closing timings of an intake valve and/or an exhaust valve, or iii) a number of deactivated cylinders is different compared to when the engine operates in the second operating mode;
a generator configured to generate electric power by using motive power to be outputted from the engine;
a drive motor coupled to a drive wheel;
a planetary gear mechanism coupled to the engine, the generator, and the drive motor; and
a processor configured to;
  control an operating point of the engine to pass through a target operating line on the plane by controlling respective operations of the generator and the drive motor, the operating point indicating the engine rotational speed and the engine torque on the plane;
  determine a first representative output and a second representative output based on traveling characteristic data that indicates a traveling characteristic in a past of the vehicle driven by a driver who drives the vehicle, the first representative output being an upper limit value of an output range that includes a predetermined percent of an entire quantity of work resulting from an output of the vehicle during a past predetermined period, the second representative output being a lower limit value of the output range, the output range being centered at a weighted average of the output weighted by the entire quantity of work;
  determine a first curve representing the first representative output on the plane;
  determined a second curve representing the second representative output on the plane;
  determine a first operating point on the first map, the first operating point being a point at which the BSFC value is lowest on the first curve on the first map;
  determine a second operating point on the first map, the second operating point being a point at which the BSFC value is lowest on the second curve on the second map;
  determine a third operating point on the second map, the third operating point being a point at which the BSFC value is lowest on the first curve on the second map;
  determine a fourth operating point on the second map, the fourth operating point being a point at which the BSFC value is lowest on the second curve on the second map;
  determine a first operating line on the first map, the first operating line passing the first operating point and the second operating point on the first map;
  determine a second operating line on the second map, the second operating line passing the third operating point and the fourth operating point on the second map;
  calculate, by using a numerical analysis simulation, a first energy efficiency of the vehicle in a case where i) the engine operates to output the first and second representative outputs in the first operating mode, and ii) the processor controls the operating point of the engine to pass through the first operating line on the first map;

calculate, by using the numerical analysis simulation, a second energy efficiency of the vehicle in a case where i) the engine operates to output the first and second representative outputs in the second operating mode, and ii) the processor controls the operating point of the engine to pass through the second operating line on the second map;

when the first energy efficiency is higher than the second energy efficiency, i) control the engine to operate in the first operating mode, and ii) determine the first operating line as the target operating line; and when the second energy efficiency is higher than the first energy efficiency, i) control the engine to operate in the second operating mode, and ii) determine the second operating line as the target operating line.

* * * * *